United States Patent [19]

Eastlund et al.

[11] Patent Number: 4,861,074
[45] Date of Patent: Aug. 29, 1989

[54] TUBING COLLAR

[75] Inventors: Bernard J. Eastlund; Kenneth J. Schmitt; Douglas C. Anderson, all of Spring, Tex.

[73] Assignee: Production Technologies International Inc., Houston, Tex.

[21] Appl. No.: 190,780

[22] Filed: May 6, 1988

[51] Int. Cl.[4] .............................................. F16L 11/12
[52] U.S. Cl. ..................................... 285/53; 285/294; 285/351; 166/60
[58] Field of Search ............... 439/191, 192, 193, 276; 166/248, 302, 60, 65.1; 285/53, 369, 54, 52, 55, 294, 297, 351

[56] References Cited

U.S. PATENT DOCUMENTS

| | | | |
|---|---|---|---|
| 1,231,202 | 6/1917 | Saylor | 285/53 X |
| 3,944,262 | 3/1976 | Stiner et al. | 285/53 |
| 4,011,652 | 3/1977 | Black | 285/53 X |
| 4,496,174 | 1/1985 | McDonald | 285/53 |

Primary Examiner—Dave W. Arola
Attorney, Agent, or Firm—M. H. Gay

[57] ABSTRACT

A collar for electrically insulating between upper and lower tubing sections in which load bearing insulating materials in the collar are isolated from fluids both interior and exterior the collar.

7 Claims, 3 Drawing Sheets

TUBING COLLAR

This invention relates to tubing collars and particularly to tubing collars in tubing strings used to transmit electrical current.

U.S. Pat. No. 4,716,960 discloses a system utilizing a tubing string to conduct electrical current while maintaining a cold well head. The well head is insulated from the electrically conducting section of the tubing by an insulating collar. While the collar disclosed in this patent has functioned satisfactorily under normal, relatively low well pressure conditions, it has been found that during stimulation procedures the high pressures involved may facilitate migration of liquids into the insulation material area and cause failures. Further, if high production pressures are maintained over a long period of time, the experience with stimulation suggest that failures might occur in the collar.

It is an object of this invention to provide an improved insulating collar in which the insulating material between metallic connectors is protected against contact by fluids in the well.

Another object is to provide a collar as in the preceeding object in which a plastic sleeve in the collar's bore, preferably under pressure, isolates the insulating material between the connectors from well fluids.

Another object is to provide a collar as in the preceeding object in which the collar includes telescoping connectors and a solid insulating sleeve of plastic material such as KEL-F is positioned in the outer connector, telescopes with the inner connector, and an insulating fluid, preferrably under pressure is confined between the sleeve and each of the inner and outer connectors.

Another object is to provide a collar as in the preceeding object in which the insulating fluid is a silicone based fluid.

Another object is to provide a collar as in the preceeding objects in which the insulating fluid is confined under pressure to support said plastic sleeve when the sleeve is under well pressure.

Another object is to provide a collar as in the preceeding object for substantial elimination of the pressure differential across the sleeve by offsetting the pressure through an incompressible fluid, preferably inserted with positive pressure, between the sleeve and the steel body.

Other objects features and advantages of this invention will be apparant from the drawings, the specification and the claims.

In the drawings where in illustrative embodiments of this invention are shown:

Figure 1:
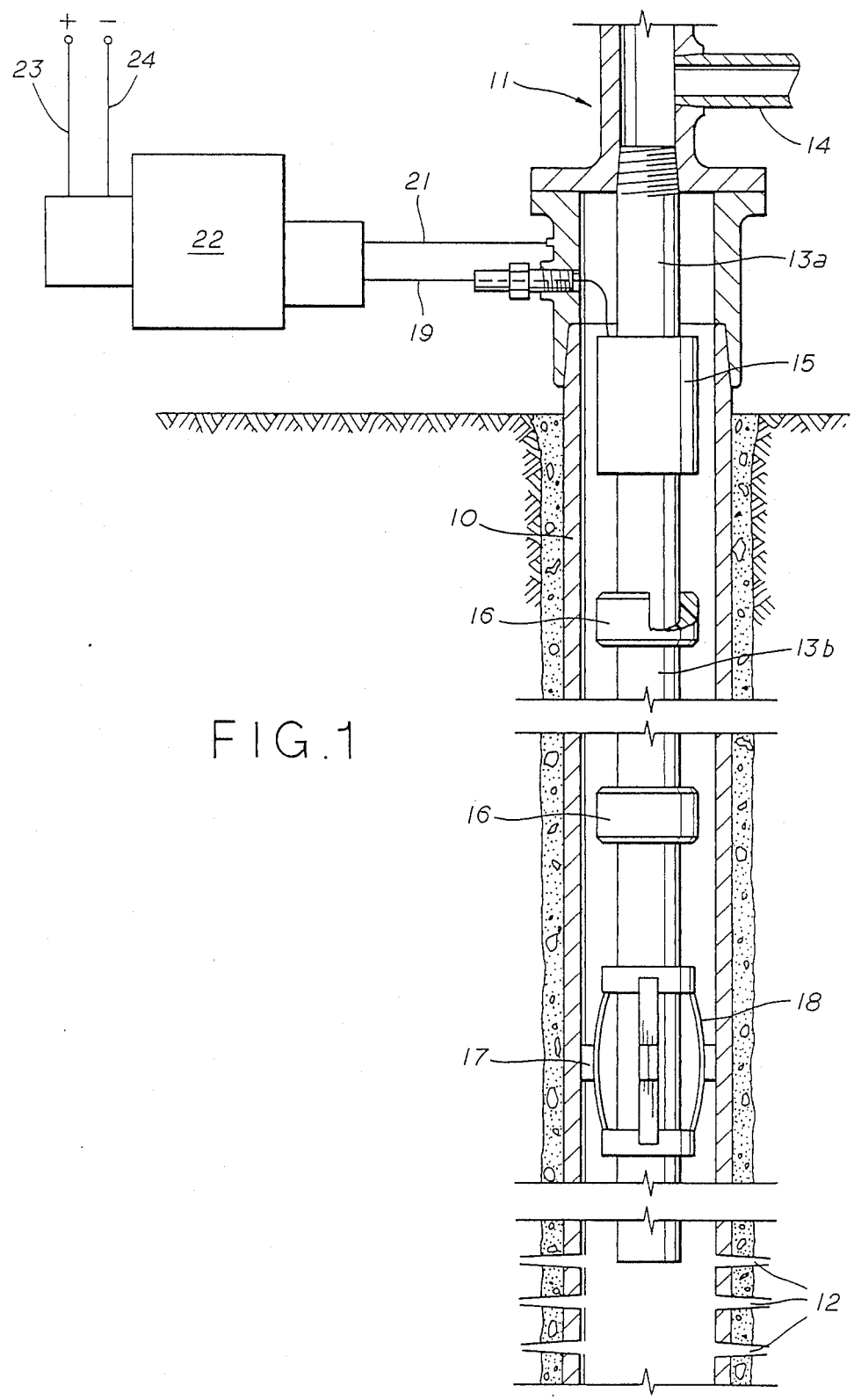
FIG. 1 is a schematic view, partly in elevation and partly in section, illustrating a system in which the collar of this invention may be employed.

Referring first to FIG. 1, a petroleum well is shown to include a casing 10 in the well bore and secured to a well head indicated generally at 11. As is conventional the casing and wellhead are formed of electrically conducting material such as steel. At the lower end of the casing, perforations 12 admit fluid from the formation into the well bore.

A tubing having an upper section 13a and a lower section 13b is suspended in the casing and conveys well fluid to the surface and out through the pipe 14 to the gathering system of the field in which the well is located.

The upper and lower sections of the tubing are connected by an insulating collar 15 which electrically insulates the two tubing sections from each other while mechanically connecting the two sections. The upper and lower tubing section are formed of electrically conducting material such as conventional steel.

Below the insulating collar 15 the tubing 13b is electrically insulated from the casing by a plurality of insulating spacers 16 which are carried on the exterior of the tubing and space the tubing from the casing. These spacers are of insulating material such as plastic and are spaced at intervals along the tubing as needed, such as on each joint of tubing, to electrically insulate the tubing from the casing.

At a selected depth which would be below the normal level of solids formation in the tubing an electrical connection is made between the casing and the tubing. This electrical connection might take any form, such as the scratcher 17 which is of generally conventional form and includes contactors 18 which are designed to cut through any material which may be present on the casing and thus engage the casing to provide good electrical contact therewith. The scratcher and its contacts are of electrically conducting material and are in electrical contact with the tubing 13b to electrically connect the tubing 13b with the casing 10.

At the surface a source of power 22 is provided for heating the tubing 13b. This source of power has one lead 19 which extends through the wall of the casing and is connected to the tubing 13b in any desired manner. In FIG. 1 this lead 19 is shown to connect to insulating collar 15.

The other lead 21 from the power source is connected to the well head at any convenient point. The source 22 may receive power from lines 23 & 24.

While FIG. 1 is specifically directed to paraffin removal it will be apparent that the collar of this invention may be used in any type of installation such as providing power to a heater or motor, or microwave or radio wave broadcasting facility.

Figure 2:
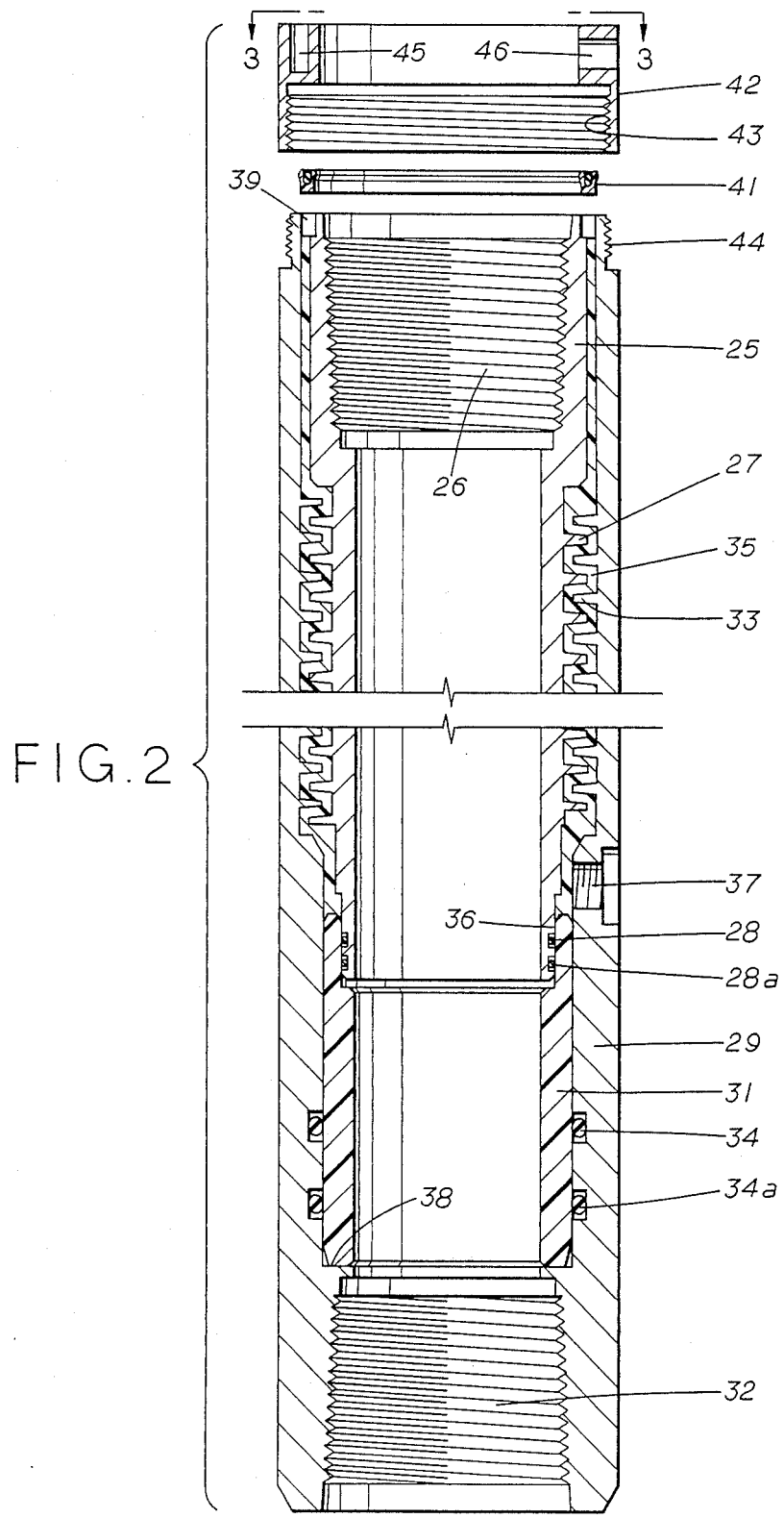
FIG. 2 is an exploded sectional view of a collar constructed in accordance with this invention.

FIG. 2 illustrates one form of this invention. Inner connector 25 is provided at its upper end with threads 26 to connect the collar to a tubing string thereabove. The connector is tubular in form and made of metal such as conventional steel utilized in tubing collars. On its exterior the connector is provided with spaced shelves 27 which preferably is a continuous thread for supporting the concentrically arranged outer connector 29. At its lower end the connector is provided with seal means such as a pair of O-rings 28 and 28a to seal with sleeve 31.

The outer connector 29 is formed of electrically conducting material such as conventional collar steel and the collar will support a tubing string secured to threads 32 in the lower end of the outer connector.

To suspend the outer connector from the inner connector, spaced shelves 33 are provided in the bore of the tubular outer connector and interlock with shelves 27. As in the case of shelves 27 these shelves 33 are preferably provided by a continuous thread. The outer connector is longer than the inner connector and the lower end of the inner connector is preferably spaced from the lower end of the outer connector for a purpose discussed below.

Adjacent the lower thread 32 seal means is provided in the bore of the lower connector by O-rings 34 and 34a for sealing with sleeve 31 as discussed below.

Insulating material is provided between the inner and outer connectors. This insulating material includes material 35 between the interlocking shelves. Material 35 provides for electrical insulation between the connectors and mechanical strength to support the weight below the collar. This material is preferably an epoxy such as an aromatic amine.

The insulating material also includes the sleeve 31, preferably formed of plastic material. The sleeve 31 bridges the space between the lower end of the inner connector and the seal means 34 and 34a and prevents electrical contact between the inner and outer connectors through water entrained in the fluid flowing through the collar. Seals 28, 28a, 34 and 34a prevent well fluids from reaching insulating material 35 in the area of the interlocking shelves. As the bore through the inner connector and sleeve should be identical the upper end of the sleeve is counterbored at 36 to telescope with the inner connector and cooperate with seals 28 and 28a.

The sleeve 31 should be formed from material having good electrical and permeability properties. Fluorocarbons such as Teflon available from E. I. Dupont, Newport, Del. may be used. It is preferred that a virgin homopolymer of chlorotrifluoroethylene such as KEL-F 81 obtainable from 3 M Company, 3 M Center, St. Paul, Minn. be used.

The sleeve 31 and the first and second seals not only insulate between the two connectors, they also prevent fluids from reaching the Epoxy 35 from the interior of the collar. The Epoxy is preferably protected from contact with well fluids which might cause shorting in the collar.

During assembly sleeve 31 is press fitted into the outer connector until it bottoms on shelf 38. The connectors are screwed together and held in the desired relationship by a suitable fixture. Epoxy is injected through port 37 until it fills the annulus between the two connectors above seal 28. An annulus 39 is provided in the upper end of the collar by removing the uppermost ring of Epoxy and a small amount of metal from each connector to provide good seal surfaces. A third seal means 41, preferably lip type, is installed in annulus 39. Before installing the seal the entire surface defining the annulus, as well as the seal are coated with a material which will preferentially wet the surfaces and seal as well as fill any voids in the seal to inhibit passage of liquid such as water pass the seal. Preferably a silicone base material discussed below is used.

The third seal means protects the Epoxy from attack by fluids in the annulus of a well such as during a stimulation operation. During normal use the well annulus will be filled with non-conducting fluid such as a gas or oil.

It is preferred that the Epoxy completely fill the annulus from the sleeve 31 to the third seal 41.

A ring 42 connects the power conduit 19 (FIG. 1) to the outer connector 29. The ring 42 is provided with internal threads 43 for making up with threads 44 on the upper end of the outer connector. A blind bore 45 is provided in the ring for connection of the power conduit by any desired connection technique. Horizontal wrench slots 46 receive tools for making up the ring on the connector.

Figure 3:
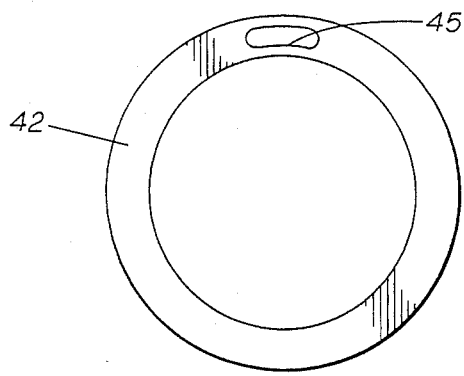
FIG. 3 is a view along the lines 3—3 of FIG. 2.
Figure 4:
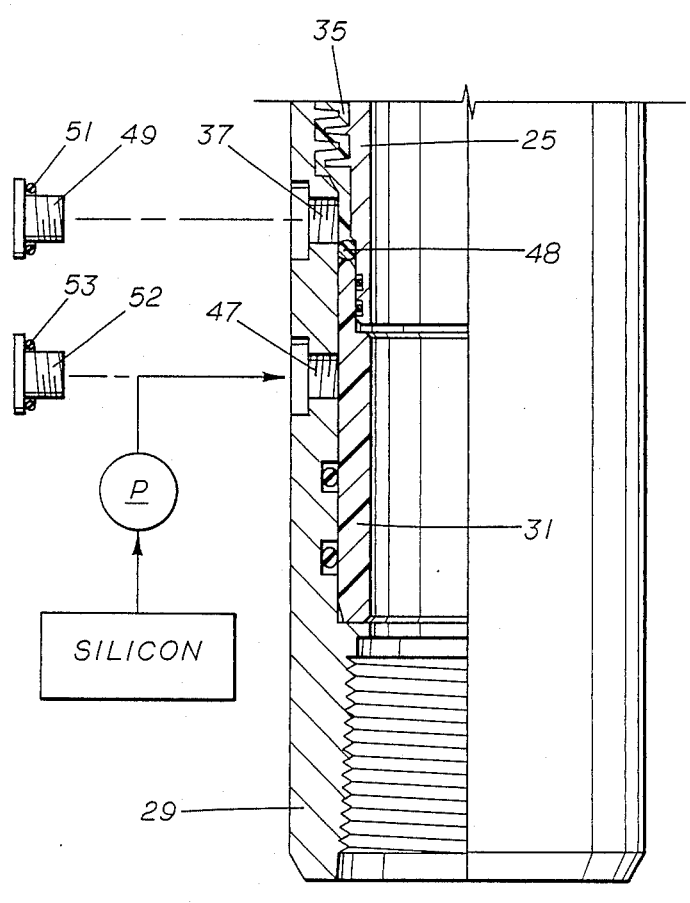
FIG. 4 is a view partly in elevation and partly in section of an alternative form of this invention.

FIG. 4 illustrate a modified form of this invention which provides even greater protection for the Epoxy insulating material. The collar is substantially the same as the FIG. 3 form and the same reference numerals have been used on identical parts. The only difference is in the addition of an O-ring and an injection port through which a protective material is injected.

In the FIG. 4 form a port 47 is provided in the outer connector overlying the sleeve 31, a fourth seal is provided by O-ring 48, and a nonsolid, noncompressible material is provided in the space defined by the first, second and fourth seal means. Preferably this material is confined under pressure so that the sleeve 31 is supported against internal pressure. Thus as pressure increases in the bore through the collar the pressure of this nonsolid material increases and no substantial differential is created across the sleeve to thus protect the sleeve. The nonsolid material is preferably not only one with good electrical characteristics but one which will preferentially wet everything it contacts and prevent any water which may pass the seals from wetting any of these surfaces. Preferably the material is a silicone base material such as Dow Corning 510, viscosity 500 cs available from Dow Corning Company, Midland, Mich.

During assembly of the FIG. 4 form of the invention the seal 48 is positioned above the sleeve 31 prior to insertion of the inner connector. After the Epoxy has been injected port 37 is closed by plug 49. An O-ring 51 may be used to protect against entry of fluid from the exterior if desired. While not shown in FIG. 3 the plug 49 and O-ring 51 are used with the FIG. 3 form of the invention.

After port 37 is closed the collar is positioned with its longitudinal axis extending horizontally and port 47 opening upwardly. A suitable fixture is attached to port 47 and the area defined by the first, second, and fourth seals evacuated to substantially a complete vacuum. The preferred silicone fluid is then injected under pressure as suggested by pump P and the reservoir of silicone. Preferably an injection pressure of about 1000 pounds is used to insure complete filling of the area. The fixture is removed and the silicone permitted to reach atmospheric pressure. Then a plug 52 having an O-ring seal 53 under its cap is doped with pipe dope and made up in port 47. During such make up the silicone will be trapped and pressurized to support the sleeve 31 against internal pressure.

The previous description is illustrative of embodiments of the present invention. Changes and modifications will be readily apparent to those skilled in the art and may be made without departing from the scope of the invention which is defined in the claims.

What is claimed is:

1. A tubing collar comprising:
    inner and outer tubular connectors of electrically conducting material concentrically arranged with one end of the inner connector positioned intermediate the ends of the outer connector,
    each of said connectors provided with threads for connecting the collar in a tubing, (and provided with threads for making up with the tubing above and below the collar,)
    a plurality of circumferentially extending (interlocking) shelves carried by the inner and outer connectors and interlocking with each other, insulating material between the inner and outer connectors electrically insulating them from each other, a sleeve of substantially non-conducting and substantially non-permeable material lining a section of the bore through the outer connector and telescoped with said one end of the inner connector, first seal means sealing between the sleeve and the inner connector, and second seal means sealing between the sleeve and the outer connector.

2. The collar of claim 1 wherein third seal means seals between the other end of the inner connector and the outer connector.

3. The collar of claim 2 wherein said insulating material extends from said first to said third seal means.

4. The collar of claim 2 wherein a fourth seal means is positioned between the inner and outer connectors and adjacent the telescoped end of said sleeve, said insulating material extends between said third and fourth seal means;

and an insulating material in non-solid non-compressible form is confined between said first, second, and fourth seal means.

5. The collar of claim 4 wherein said non-solid non-compressible material is a silicone base fluid.

6. The collar of claim 5 wherein said silicone base fluid is under pressure.

7. The collar of claim 1 wherein said sleeve is a virgin homopolymer of chlorotrifluoroethylene.

* * * * *

UNITED STATES PATENT AND TRADEMARK OFFICE
CERTIFICATE OF CORRECTION

PATENT NO. : 4,861,074
DATED : Aug. 29, 1989
INVENTOR(S) : Bernard J. Eastlund; Kenneth J. Schmitt; Douglas C. Anderson It is certified that error appears in the above—identified patent and that said Letters Patent is hereby corrected as shown below:

Claim 1, lines 7, 8, and 9, cancel, (and provided with threads for making up with the tubing above and below the collar,).

Claim 1, lines 10 and 11, cancel, (interlocking).

Signed and Sealed this

Eleventh Day of September, 1990

Attest:

HARRY F. MANBECK, JR.

Attesting Officer        Commissioner of Patents and Trademarks